Dec. 23, 1969 A. G. WEYRICH ET AL 3,485,456

REEL STRUCTURE

Filed Jan. 15, 1968

Inventors:
Arthur G. Weyrich
Chester J. Tellen
By Bair Freeman & Molinare Attys.

United States Patent Office 3,485,456
Patented Dec. 23, 1969

3,485,456
REEL STRUCTURE

Arthur G. Weyrich, Rolling Meadows, and Chester J. Tellen, Mount Prospect, Ill., assignors to Amerline Corporation, a corporation of Illinois Filed Jan. 15, 1968, Ser. No. 697,892
Int. Cl. B65h *75/18*
U.S. Cl. 242—71.8 6 Claims

ABSTRACT OF THE DISCLOSURE

A reel for storing computer tape, the reel including a hub, and a pair of substantially parallel, annular flanges mounted on opposite sides of the hub. The flanges are secured together by means of a plurality of drive screws which pass through aligned openings in one of the flanges and in the hub and which are securely received within wells or depressions provided in the other of the flanges.

BACKGROUND OF THE INVENTION

Field of the invention and description of the prior art

This invention relates to an improved reel for storing magnetic computer tape.

Magnetic tape used in conjunction with modern computers requires great care in storage and handling. If the tape is damaged in any way, as along the lateral edges of the tape, or if any impurities come into contact with the tape, such as dust, inaccurate reading of the tape or "drop outs" are likely to occur. During storage, reels containing tape are normally kept in containers which maintain the tape in a dust free condition. In order to avoid damaging the lateral edges of the tape, tape reels are normally constructed under very exacting manufacturing standards so that the reel flanges are maintained in a parallel condition and at a substantially uniform, predetermined spacing to thereby avoid damaging the lateral edges of the tape.

One important factor which must be taken into consideration in the design of computer tape reels is that the reel flanges must be firmly attached to a separate hub to provide a rigid, integral structure which protects the tape while wound in the stored position around the hub of the reel.

Many prior art computer tape reels, although generally of highly satisfactory construction, are constantly being improved. One significant improvement is found in U.S. patent application Ser. No. 590,791, filed Oct. 31, 1966, of Arnold P. Hultgren. In the said application, a plastic hub has a metal insert for the twofold purpose of reinforcing the hub to withstand the pressure exerted by the tape wound on the reel and for providing a hub having substantially the same coefficient of expansion and contraction as the magnetic tape wound on the reel. In the said application, it has been suggested that one way to join the two flanges to the hub is by means of sonic or solvent sealing the inner surfaces of the flanges to the outer lateral edges of at least one of the rims of the hub. Although this method of manufacture would be satisfactory and would provide highly desirable results, joining plastic materials together by such methods creates problems in manufacturing control of the reels. For example, these joining methods present undesirably difficult problems in maintaining tolerances and maintaining quality control over the reels. Other methods of joining the flanges to the hub have also been suggested, such as forming heads on integral projections on one flange by heat and pressure wherein the formed heads hold the other flange to the hub. All known methods, however, present control and quality control problems and also often fail to provide a rigid structure, which is completely satisfactory.

SUMMARY OF THE INVENTION

It is therefore an important object of this invention to provide an improved reel for storing computer tape wherein the annular flanges of the reel are positively secured to the hub, which structure avoids many of the disadvantages of the prior art reels.

It is also an object of this invention to provide an improved reel wherein the flanges are joined to the hub by means of a plurality of metal drive screws.

It is a further object of this invention to provide an improved reel for storing computer tape wherein the reel is particularly characterized by its simplicity and economy of construction and manufacture.

Further purposes and objects of this invention will appear as the specification proceeds.

Generally, our improved reel for storing computer tape includes a central hub having an inner rim, an outer rim upon which the computer tape is wound, and a web for interconnecting the inner rim with the outer rim. A first annular flange abuts one side of the hub and a second annular flange abuts the opposite side of the hub. The web has a plurality of apertures in it, the first flange has a plurality of openings in alignment with the apertures in the web, and the second flange has a plurality of wells in alignment with both the openings and the apertures. Metal drive screws are passed through the openings in the flange and through the apertures in the web and are received within the wells provided in the second flange. The drive screws, which include enlarged head portions, positively and mechanically hold the flanges together with the reel hub between.

BRIEF DESCRIPTION OF THE DRAWINGS

Referring to the accompanying drawings, there is shown one preferred embodiment of our invention, wherein.

DESCRIPTION OF THE PREFERRED EMBODIMENT

Figure 1:
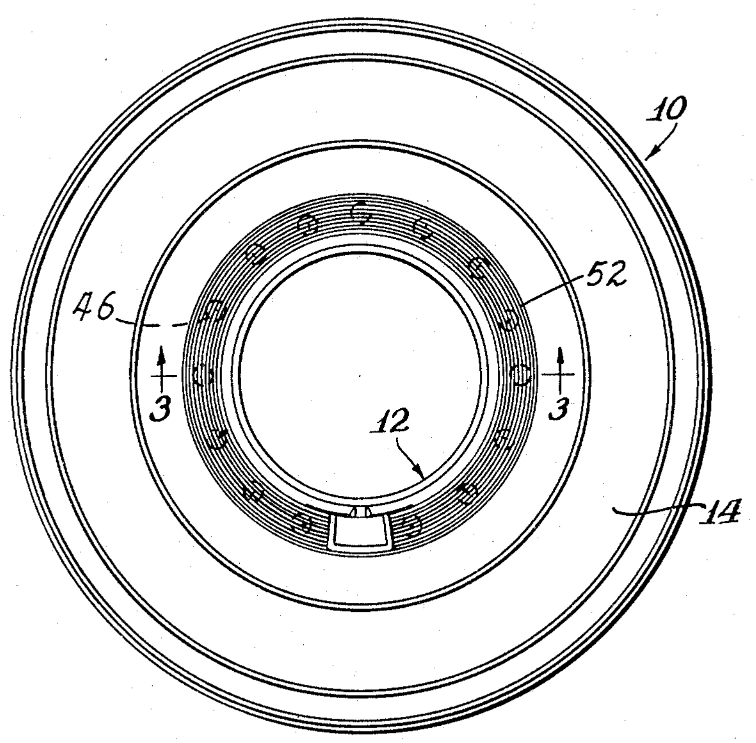
FIGURE 1 is a top plan view of our improved tape reel structure.
Figure 2:
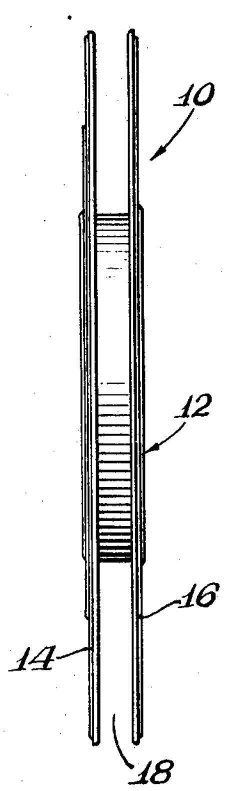
FIGURE 2 is a side elevational view of the tape reel of FIGURE 1.

Referring to the accompanying drawings, our improved reel, generally 10, for storing computer tape, includes a central hub portion 12 and a pair of opposed annular, substantially parallel flanges 14 and 16 rigidly mounted to the opposite sides of the hub 12. The flanges 14 and 16 cooperate with the hub to define a winding space 18 therebetween for storing computer tape on the hub 12 and between the flanges 14 and 16. The flanges 14 and 16 must be maintained at a predetermined parallel spacing so that as computer tape is wound around the hub 12, the lateral edges of the tape do not become damaged because of inaccuracies or distortions in the spacing between the opposite flanges 14 and 16.

Figure 3:
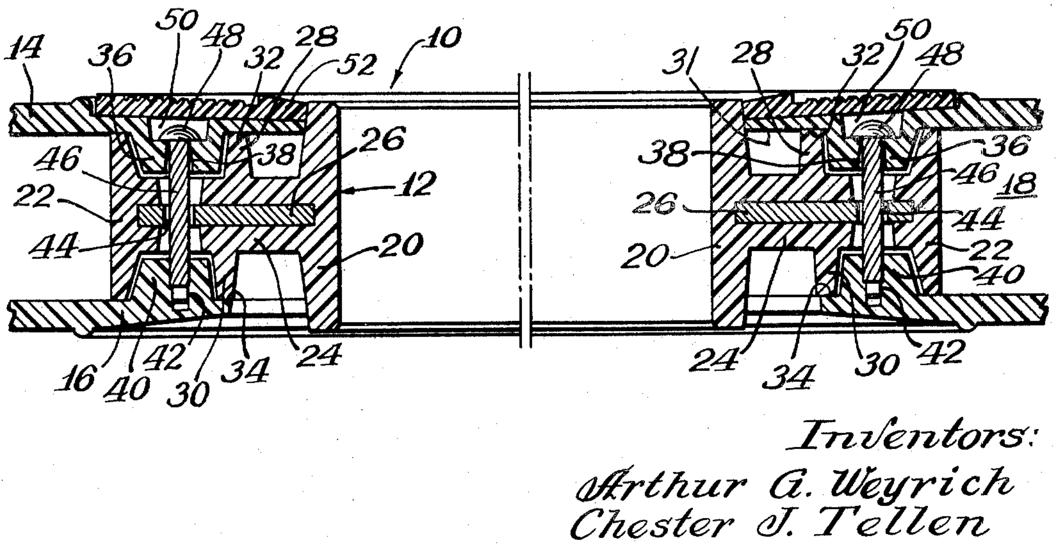
FIGURE 3 is an enlarged cross-sectional view taken along the line 3—3 of FIGURE 1 showing the structure for joining the tape reel flanges to the tape reel hub.

Referring to FIGURE 3, the hub 12 includes an inner rim 20 which has its inner periphery for mounting the reel upon the tape drive of a computer or a tape drive machine. The hub 12 also includes an outer rim 22 having an outer surface which receives the computer tape. The width of the outer rim 22 is less than that of the inner rim 20. An annular web 24 interconnects the inner rim 20 and the outer rim 22 of the hub 12. The web 24 is positioned intermediate the lateral edges of both the inner and outer rims 20 and 22.

Preferably, the hub 12 is made of a rigid molded plastic material, such as ABS, and includes an interior metal insert 26, which provides reinforcement for the plastic hub while at the same time cooperating with the plastic portion of the hub 12 to provide a hub having a coefficient of expansion and contraction substantially equal to that of the computer tape stored on the reel. The structural details of the preferred construction of the hub 12 are found in U.S. patent application Ser. No. 590,791. Although it is preferred that the described type of hub be used in our construction, other types of hub constructions may be used with our invention.

A first annular rib 28 projects laterally from the web 24 at a point intermediate the outer rim 22 and the inner rim 20. A second annular rib 30 projects from the opposite side of the rim 24, also at a position intermediate the inner and outer rims 20 and 22. The annular ribs 28 and 30 are both substantially parallel to the inner and outer rims 20 and 22.

The first reel flange 14, also constructed of a rigid molded plastic material, includes an inner surface 31 which abuts the upwardly facing edge 32 of the outer rim 22 of the first annular rib 28. The inner peripheral edge of the flange 14 is substantially equal to the outer diameter of the inner rim 20 so that the inner rim acts as a guide for the proper axial location of the flange 14 on the hub 12.

The second reel flange 16 has its inner peripheral edge substantially equal in diameter to that of the lower rib 30. The inner surface of the lower flange 16 abuts the lower edges 34 of the bottom rib 30 and the outer rim 22. The width of the outer rim 22 is substantially equal to the width of computer tape and this spacing is maintained between the flanges by rigidly and positively securing the flanges 14 and 16 to the hub 12 for maintaining the flanges in place on the hub.

The first flange 14 includes a plurality of downwardly extended bosses or reinforced portions 36 which surround a plurality of apertures 38. The bosses 36 extend inwardly from the inner surface of the flange 14 and are received within the annular space defined between the web 24, the top rib 28, and the outer rim 22. In a similar way, inwardly projecting bosses 40 extend from the second flange 16 into the annular space defined between the web 24, the bottom rib 30, and the outer rim 22. The reinforced bosses 40 surround a plurality of wells 42. The wells 42 are aligned with the apertures 38 in the first flange 14. Both the set of apertures 38 and the set of wells 42, in turn, are in alignment with openings provided in the metal insert 26 of the hub 12. Preferably, locating means, such as cooperating locating pins and apertures (not shown) in the flanges 14 and 16 and in the hub 12, are provided for assuring proper alignment between the wells 42, the apertures 38, and the openings 44 in the web 24.

Metal threaded drive rivets or screws 46, having enlarged heads 48, are passed through the apertures 38, through the openings 44, and are received within the wells 42 in the lower flange 16. Upon being driven into the wells 42, the screws 46 become securely embedded within the mass of the bosses 40 surrounding the wells 42. The enlarged heads 48 abut the outer surface of the bosses 36 in the top flange 14 so that the flanges 14 and 16 are rigidly secured to the hub 12 by the threading action of the drive rivets 46 cutting into the wells 42. Preferably, an annular tolerance is provided around the outer periphery of the drive screws 46 relative to the openings 44 in the web 24 and in the apertures 38 in the flange 14, so as to assure that the enlarged heads 48 bottom or abut against the upper surface of the bosses 36 to thereby assure proper threading of the drive screws 46 within the wells 42.

Preferably, the drive screws 46 are inserted into the wells 42 in such a manner that the material surrounding the wells 42 softens to permit the screws to be driven with little force and so that thereafter the soft, fluid plastic flows into the threads on the screws to provide increase mechanical holding power. The drive screws are advantageously driven into the wells 42 by ultrasonic action or by heat insertion or driving techniques in order to provide the desired results.

The enlarged heads 48 are received within recesses 50 defined in the bosses 36. An annular cover 52 is provided over the flange 14 so that the heads 48 are completely enclosed and invisible from an external inspection of the completed reel 10. The annular cover 52 may be secured to the outer surface of the upper flange 14 by any suitable means, such as by solvent joining to the flange 14.

From the foregoing description of our improved reel 10, it is seen that we have provided a reel which is highly satisfactory for storing magnetic computer tape. The flanges are joined together to the hub positively and securely. There is no problem of controlling tolerances as is commonly encountered in solvent type of joining the plastic parts, and a highly rigid, sturdy reel construction is provided.

While in the foregoing, there has been provided a detailed description of a particular embodiment of the present invention, it is to be understood that all equivalents obvious to those having skill in the art are to be included within the scope of the invention as claimed.

What we claim and desire to secure by Letters Patent is:

1. A reel for storing computer tape, said reel comprising a central molded plastic hub having an inner rim, an outer rim for receiving said computer tape, and a web interconnecting said inner rim and said outer rim, a plurality of apertures disposed in said web, a first annular flange of molded plastic mounted on one side of said hub, a plurality of openings in said first flange and in alignment with said apertures, a second annular flange of molded plastic mounted on the opposite side of said hub, said flanges and said outer rim defining a winding space for said tape, a plurality of wells in said second flange in alignment with said apertures and said openings, and a plurality of threaded metal driven fastener means passing through said apertures and said openings and being embedded within the plastic defining said wells, said driven fastener means including an enlarged head portion for abutting said first flange for firmly holding said flanges in place on opposite sides of said hub.

2. The reel of claim 1 wherein the spaces between threads of said driven fastener means are filled with plastic flowed therein during driving of said screws.

3. The reel of claim 1 wherein said openings are surrounded by integrally formed reinforcing portions, and said wells are surrounded by integrally formed reinforcing portions.

4. The reel of claim 3 wherein said openings are recessed for receiving said enlarged heads of said fastener means, and an annular cover member encloses said recesses so that said heads are not visible from the exterior of said reel.

5. The reel of claim 1 wherein said hub has a reinforcing metal insert therein, and said fastener means are metal threaded drive screws.

6. The reel of claim 3 wherein a first rib is defined intermediate said rims on said web and a second rib is defined on the opposite side of said hub intermediate said rims and on said web, said reinforcing portions surrounding said openings are received in the space defined between said first rib and said outer rim, and said reinforcing portions surrounding said wells are received between said second rib and said outer rim.

References Cited

UNITED STATES PATENTS

| | | |
|---|---|---|
| 1,858,586 | 5/1932 | Goldberg et al. |
| 3,088,689 | 5/1963 | Perlini. |
| 3,350,028 | 10/1967 | Lear. |

NATHAN L. MINTZ, Primary Examiner